United States Patent [19]

Timmer et al.

[11] Patent Number: 4,683,941
[45] Date of Patent: Aug. 4, 1987

[54] SYSTEM FOR CONTROLLING THE TEMPERATURE OF ROOMS

[75] Inventors: Hans H. Timmer, Erkrath; Wolfgang Reichel, Iserlohn, both of Fed. Rep. of Germany

[73] Assignee: Ingenieurburo Timmer GmbH, Fed. Rep. of Germany

[21] Appl. No.: 832,632

[22] Filed: Feb. 25, 1986

[30] Foreign Application Priority Data

Mar. 6, 1985 [DE] Fed. Rep. of Germany ....... 3507951

[51] Int. Cl.$^4$ .............................................. F24H 3/00
[52] U.S. Cl. ...................................... 165/47; 237/69; 165/49
[58] Field of Search ...................... 237/70, 69; 165/47, 165/50, 49, 53, 183

[56] References Cited

U.S. PATENT DOCUMENTS 2,226,061 12/1940 Kershaw ........................... 237/69 X
4,191,243 3/1980 Donzis .............................. 237/69 X
4,203,487 5/1980 Gartner ............................ 237/69 X Primary Examiner—Henry A. Bennet
Attorney, Agent, or Firm—Goodman & Teitelbaum

[57] ABSTRACT

System for controlling the temperature of rooms of a building by frame elements consisting of metal uprights and cross-beams, for example for building openings, such as windows and doors, in which with fluid conducted in a pipe line (1) running through the hollow interior space of the uprights and cross-beams, the faces facing the interior of the building of the frame elements are controlled in temperature by indirect heat transfer. The indirect heat transfer occurs between the pipe lines (1) and the heat transfer profiles (5) formed by the frame elements by engagement of the pipe line (1) on heat conducting contact surfaces (6) which are connected in one piece over crosspieces (7) for heat conduction with the heat transfer profile (5).

27 Claims, 15 Drawing Figures

SYSTEM FOR CONTROLLING THE TEMPERATURE OF ROOMS

The present invention relates to a system for controlling the temperature of rooms of a building by means of frame elements consisting of metal uprights and cross-beams, for example for building openings, such as windows and doors, in which, with a fluid conducted in a pipe line running through the hollow interior space of the uprights and cross-beams, the surfaces facing the interior of the building of the frame elements are temperature-controlled by direct heat transfer.

Such a system is known from German patent No. 18 10 493. Here it is a matter of an air heating system, in which the interior spaces of the frame elements are constructed as air-conducting channels and the heating pipes present a plurality of longitudinal ribs. This known system is based, accordingly, essentially on the principle that the air circulating through the interior spaces is warmed over the heating pipes and emerges from the frame elements at air exit openings and hereby the space facing the frame elements is warmed. Here, however, there also occurs an indirect heating of the frame elements themselves. The efficiency of the heat transfer to the frame elements, however, is relatively poor, so that the heat emission of the frame elements contributes only in a slight degree to room heating or temperature control.

Further, from German patent No. 26 21 186 there is known a system in which a heat transfer medium, in particular a fluid, is conducted through the uprights and cross-beams, whereby the temperature is controlled by the surfaces of the uprights and cross-beams facing the interior of the building. The heat transport fluid flowing into the uprights and cross-beams stands under high pressure, namely the static pressure corresponding to the height of the building plus the requisite excess pressure and circulating pump pressure. Since the uprights and cross-beams are flowed through directly, large circulation volumes are required, which result in a great inertia of the regulating system. Moreover, the uprights and cross-beams filled with the heat-transport fluid cause great losses in heat. Further, it is disadvantageous the a high demand on the precision is requisite in the manufacture of the housing elements in order to assure an absolute tightness, whereby there are yielded high manufacturing and assembling costs.

Underlying the present invention is the problem, proceeding from a system of the type described at the outset, of improving this system in such a way that the efficiency of the system, i.e. the heat transition from the pipes flowed-through by the heat transport fluid to the frame elements is improved and an additional heating by air circulating through the heating elements is dispensed with. Underlying the invention, further, is the problem of making it possible to use pipe lines that can be laid as flexible pipe lines inside the frame elements.

According to the invention this is achieved by the means that the indirect heat transfer between the pipe lines and the heat transfer profiles occurs emplacement of the pipe lines on heat conducting contact surfaces which are joined over heat conducting crosspieces in one piece with the heat transfer profile. According to the invention it is thereby possible to use, for the heat transport pipe line, forms such as are used, for example for the formation of floor heating systems. Moreover, these pipe line systems can be operated with a relatively low volume of water, from which there is yielded a low intertia of the system of the invention, since the liquid volume can be rapidly heated and cooled. Further, known connecting elements can be used, and the heat transfer profiles require no special formation in respect to their mutual connection.

The present invention is based on the surprising insight that with the given direct contact between the pipe line and the heat conducting contact surfaces there occurs a sufficient heat transfer to the heat transfer profile. There can be used there preferably according to the invention pipe lines, for example of copper tubing, of the dimensions $12 \times 1$ mm and $10 \times 1$ mm.

Advantageous executions of the invention are contained below.

With the aid of the examples of execution represented in the attached drawings the invention is now explained in detail.

Figure 1:
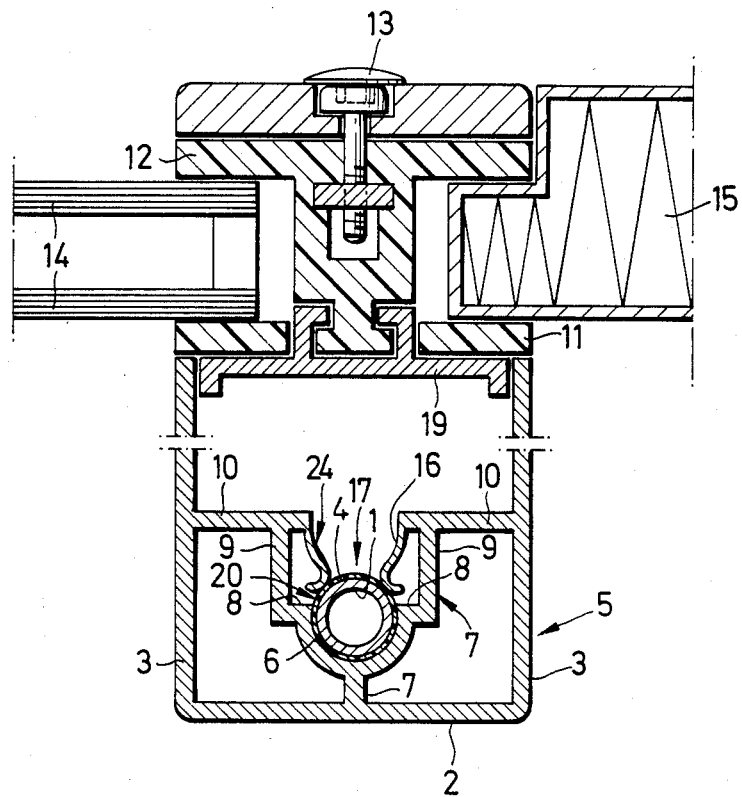
FIG. 1 shows a section through a frame element as part of the system according to the invention.

As is evident from FIG. 1, a system element of the invention, which is part of a building outer wall or facade, consists of a pipe line 1 which is flowed through by a heat transfer medium, especially a transport fluid, for example water, and of a heat transfer profile 5, which is connected with the pipe line 1 over a heat conducting contact element 4. With this heat conducting contact element 4 it can be a matter of a contact film or of a foil or a coating or sleeve, especially of synthetic material. Further, there is provided a heat conducting contact surface 6 which in arcuate adaptation, especially as a semicircular profile (half-shell profile), runs to the pipe line 1 and which is connected over heating conducting crosspieces 7 with the inside of the heat transfer element 5. Also the heat transfer element or profile 5 is thus arranged separate from the heat or cold conducting pipe line 1 and is formed by the framework elements consisting, for example, of uprights or crossbeams, so that it serves simultaneously for the reception of the building facade. By an integrated clamping device 24 the pipe line 1 is pressed over the heat conducting contact element 4 onto the heat conducting contact surface 6. With the heat transfer profile 5 it is a matter preferably of an upright or a cross-beam of metal, which form in common as framework element, a framework such as is used in building for the construction of facade walls. These metal frameworks consist preferably of aluminum, but also other materials with corresponding properties can be used. Preferably the framework elements have a rectangular cross section, but other cross section forms, for example circular cross sections, are possible. The heat transfer element 5 can also serve, detached from upright and cross-beam function, exclusively for the room heating and room cooling. For this purpose the heat transfer profiles 5 are integrated into the room enclosure and arranged in the zone of windows, walls or ceilings. As heat transport medium there is preferably used water to which, in a known manner there are admixed corrosion-inhibiting additives.

As is evident from FIG. 1, the system element according to the invention serves for the reception of the building facade, which may consist, for example, of insulating glass panes 14 or windows as well as outside-railing or outer wall-insulating walls 15. These facade elements are fastened to the system element of the invention by means of an insulation support 12 and a screw fastening 13. Further it is to be provided preferably that the building facade is thermally separated by insulation profiles 11 from the heat transfer profile 5, i.e. the upright or the cross-beam, to avoid heat losses. The heat transport represented between the pipe line 1 and the heat transfer profile 5 from the heat transport medium in the pipe line 1 over the pipe wall of the pipe line 1, the heat conducting contact element 4, the heat conducting contact surface 6 and the heat conducting crosspieces 7 to the heat transfer element or profile 5 occurs according to the invention in such a way that an indirect heat transfer is given between the pipe line 1 and the heat transfer profile 5.

The substantial advantage of the present invention lies in that the heat- or cold-conducting pipe lines 1 are separated from the heat transfer profiles 5, whereby the circulating volume of the heat transport agent flowing in the system of the invention is minimized. Further, there is therewith yielded the advantage that the uprights and cross-beams become virtually pressureless, whereby the manufacture is substantially simplified and the the heat transfer properties can be regulated more easily and more optimally. Moreover, a high operating security is achieved, since the uprights and cross-beams are pressureless. There is yielded there according to the invention a high economy, since slight heat losses arise as well as a considerably saving in material because of the low cross-sectional dimensions. Further, a lowering of costs is achieved through the fact that no additional frameworks or scaffolding are necessary for the installation and likewise through the possibility of a cost-saving manufacture, since no precision parts are needed for this. The system of the invention is usable in new structures and old structures, since a subsequent installation is also possible.

As is represented in FIG. 1, the half-shell-form heat conducting contact surface 6 is connected over three crosspieces 7 with the heat transfer profile 5, and, namely, in each case over a crosspiece 7, with one wall surface of the heat transfer profile 5. One of the crosspieces 7 is constructed opposite the receiving opening 20 of the heat conducting contact surface 6, and the other two crosspieces 7 are offset with respect to this crosspiece through 90°. The latter crosspieces begin at the longitudinal edges 8 of the half-shell-form heat conducting surface 6 and run with a crosspiece section at first parallel to the insulating glass plate 14 and then with with a further crosspiece section section perpendicularly to the preceding section, whereby there is yielded an extension section 9, which then again goes over into a section 10 running parallel to to the insulating glass pane. The crosspiece sections 10 end in the side walls perpendicular to the insulating glass plate of the heat transfer profile 5. The crosspiece 7 ends, proceeding from the heat conducting contact surface 6, in the side wall 2 parallel to the insulating glass plate 14 of the heat transfer profile 5. On the free ends of the crosspiece sections 10 there are molded clamping elements that are constructed as spring arms 16. These spring arms 16 form the clamping device 24 to fix the pipe line 1 inside the half-shell-form heat conducting contact surface 6, so that there exists an intimate direct contact between the two. There it is expedient if the half-shell profile of the heat conducting contact surface 6 extends over the entire length of the pipe line 1. The springy holding arms 16 lying opposite one another are bent away from one another at their free ends and enclose an insert opening 17, through which there is thrust the pipe line 1, the holding arms 16 then being spread apart, and after the pressing-through of the pipe line 1 the holding arms 16 jump back and lie with their bent-off ends against the pipe line 1 and fix this in the heat conducting contact surface 6.

Figure 2:
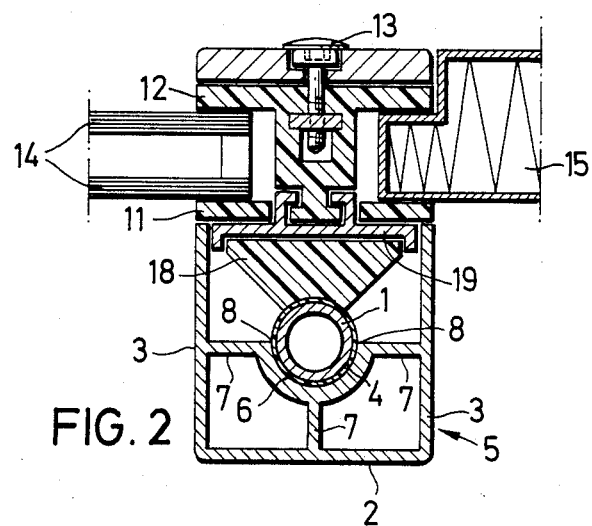
FIGS. 2 to 12 show further sections through embodiments according to the invention of frame elements of the system according to the invention.

In FIG. 2 there is represented an alternative form of execution of the invention to FIG. 1, in which like parts are provided with the same reference numbers as in FIG. 1. In this embodiment the crosspieces 7 ending in the vertical side walls 3 are constructed in such a way that proceeding from the edges 8 of the heat conducting contact surface 6 they run parallel to the insulating glass plate 14. By a supporting insulating element 18 that is constructed about truncated-conical in cross section and is installed between between pipe line and a carrier wall 19, the pipe line 1 is fixed heat-insulating from the outer facade and pipe-conducting in the heat conducting contact surface 6. On the carrier wall 19 there is fastened with sutiable fastening means the one-piece heat transfer profile 5 consisting of the side walls 2, 3, the crosspieces 7 and the heat conducting surface 6.

Figure 3:
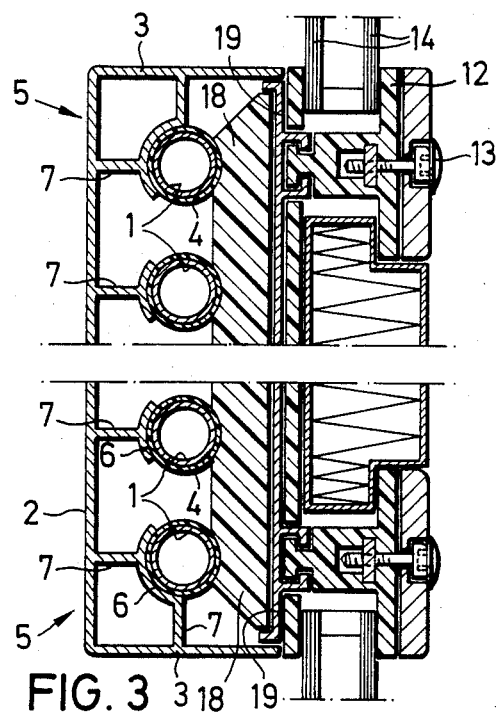

In FIG. 3 there is represented another embodiment of the invention, in which like parts are provided with the same reference numbers as in FIGS. 1 and 2. Here, in distinction to the preceding embodiments, inside the heat transfer profiles there is represented a multiple pipe arrangement of conducting pipes 1. This form of execution of an element according to the invention can be used especially as a wall or railing heating system, in which otherwise there is given the same functioning as in the aforedescribed examples of execution.

Figure 4:
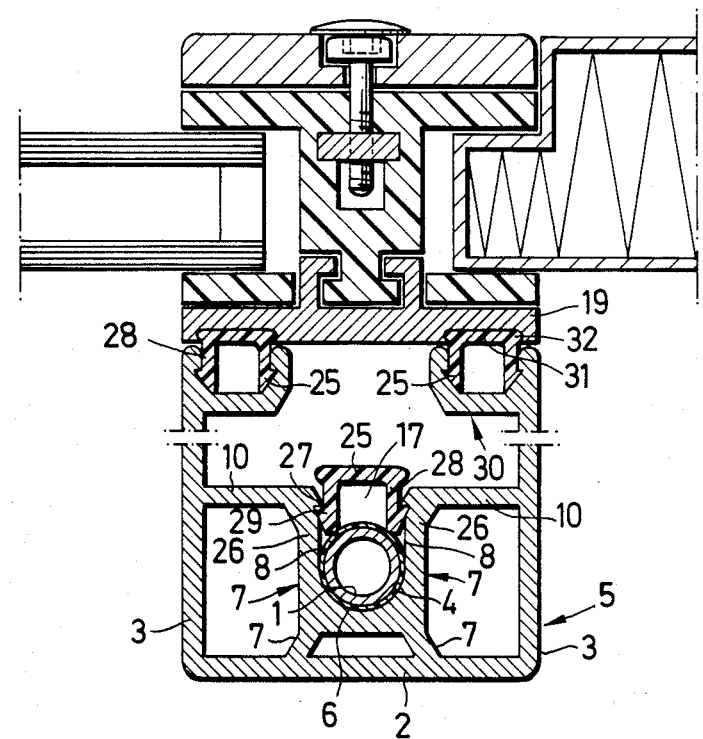

In FIG. 4 there is shown a further form of execution of the invention, like parts being provided with the same reference numbers as in FIGS. 1 to 3. In particular, the heating conducting crosspieces 7 are differently arranged. Unlike the embodiment according to FIG. 1, instead of an integrated clamping device 24 there is present a separate profile clamping device. In this shown embodiment instead of a crosspiece running perpendicularly to the side wall 2 there are represented two crosspieces 7, altogether the half-shell profile forming the heat conducting contact surface 6 being construced more massively. On the edges 8 of the heat conducting contact surface 6 in the embodiment represented there are constructed oppositely lying rest arms 26, which run parallel to the side walls 3 and at their free ends go over into horizontal crosspiece sections 10. These rest arms 26 present undercuttings 27 at their free ends. The profile clamping device consists of clamping bodies 25 which have substantially U-shaped cross section, the two vertical U-shanks 28 having at the end outward protruding rest cams 29. The vertical U-shanks 28 are constructed spring-elastic, so that in the insertion into the plug-in opening 17 bounded by the rest arms 26 they are bent toward each other and in the snapped-in state, when the rest cams 29 are snapped into the undercuttings 27, they spring apart again. In the snapped-in state of the clamping bodies 25 these, by reason of the length of the rest arms 26, press the pipe line 1 into the half-shell profile of the heat conducting contact surface 6, so that there is present an intimate direct contact. In the embodiment represented there are likewise provided the clamping bodies 25 for connection of the heat transfer profile 5 with the carrier wall 19. For this purpose on the insides of the vertical side walls 3 there are constructed receiving chambers 30 in which the clamping bodies 25 can snap in place with clamping effect with their vertical U-shanks 28. The clamping bodies 25 are fixed with their horizontal U-shank 31 in recesses 32 of the carrier wall 19.

Figure 5:
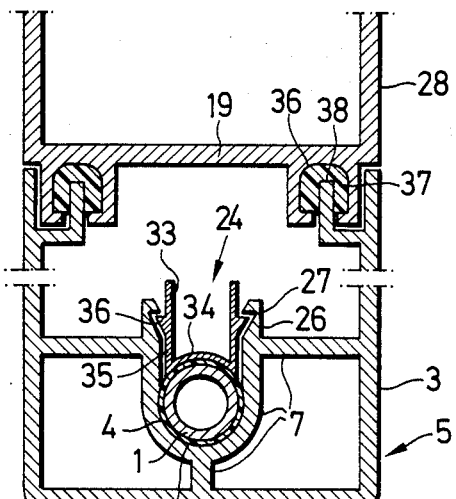

In FIG. 5 there is represented another form of execution of the invention. Here, too, like parts are provided with the same reference numbers as in FIGS. 1 to 4. The difference from the preceding embodiments lies essentially in the construction of the clamping device 24 as well as in the fastening between the heat transfer profile 5 and the carrier wall 19. The clamping device 24 consists in the embodiment represented of a U-shaped holding clamp 33 which runs arcuately with its U-base shank 34 and is fitted to the pipe line 1. On the vertical U-shanks 35 there are molded on their outside rest cams 36. In the inserted state of the holding clamps 33 these rest cams 36 grip behind undercuttings 27 of the rest arms 26 which are formed in extension of the shell-form heat conducting contact surface 6. The vertical shanks 35 of the holding clamps 33 are spring-elastic in such a way that in the insertion of the holding clamps into the insertion opening bounded by the rest arms 26, the U-shanks 35 are bent toward one another and on reaching the undercuttings 27 by the rest cams again spring apart. The distanc of the rest cams from the base shank 34 is chosen in such a manner that the holding clamp presses the pipe line 1 firmly against the heat conducting contact surface 6. There occurs there also a heat transfer over the holding clamp 33 to the heat transfer profile The fastening between the heat transfer profile 5 and the carrier wall 19 consists of chambers 36 formed on the carrier wall in which there are arranged filling bodies 37. In these filling bodies 37 there are inserted plug-in profiles 38, which are molded to the insides of the side walls 3 of the heat transfer profile 5. The insert (plug-in) profiles 38 have on their outside a toothed profile, whereby the holding action in the filling body is improved. The filling body 37 consists of an elastic material.

Figure 6:
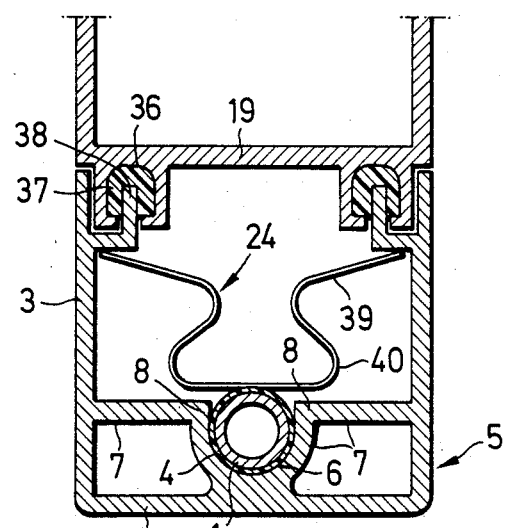

In FIG. 6 there is represented a further embodiment of the invention, in which like parts are provided with the same reference numbers as in the preceding figures. In this form of execution there serves as clamping device 24 a leaf spring 39 which abuts with its free shanks on the insert profiles 38 of the heat transfer profile and lies with a bulge 40 against the pipe line 1 resiliently under bias tension, whereby this in turn is pressed into the heat conducting contact surface 6 and fixed there. As the vertically running crosspiece 7 is reduced in such a way that the heat conducting contact surface 6 is molded directly on the horizontal side wall 2, there is yielded a compact construction of the heat transfer profile 5. The horizontal crosspieces are molded directly to the longitudinal edges 8 of the heat conducting contact surface 6.

Figure 7:
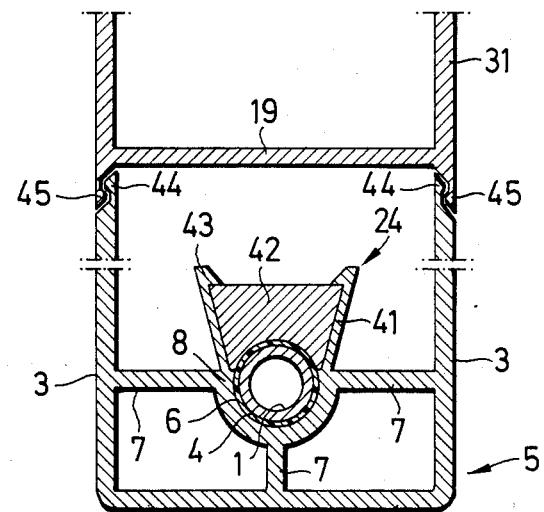

In FIG. 7 there is represented a further alternative embodiment of a heat transfer profile according to the invention, in which again like parts are provided with the same reference numbers as in the preceding figures. The formation of the heat conducting contact surface 6 as well as of the crosspieces 7 corresponds to the form of execution according to FIG. 2. In the zone of the starting point of the horizontal crosspieces 7 on the profile of the heat conducting contact surface 6 in extension of the same there are formed on the oppositely lying edges 8 springy holding arms 41, between which there is clamped a clamping body 42. The clamping body 42 is in the form of a truncated cone in cross section, its apex running concavely and being adapted to the pipe line 1. The holding arms 41 present rest cams 43 springing toward one another, which grip over and fix the clamping body 42 in its slid-in state. The clamping body 42 and the length of the holding arms 41 are such that the clamping body 42 is pressed with a certain bias tension onto the pipe line 1, so that this stands in intimate contact with the heat conducting contact surface 6. The heat transfer profile 5 presents on the free ends of its vertical side walls 3 hook-shaped continuations 44 which interact with hook-shaped continuations 45 on the carrier wall 19, so that there is achieved here a clamping connection between the carrier wall 19 and the heat transfer profile 5 by snapping in place of the hook-shaped continuations with one another. This type of connection has a tension-compensating effect.

Figure 8:
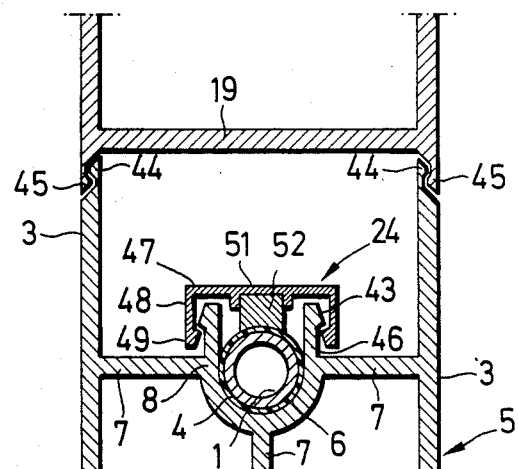

In FIG. 8 there is represented an alternative embodiment of the invention, in which like parts are provided with the same reference numbers as in FIGS. 1 to 7. Unlike the form of execution according to FIG. 7, on the profile of the heat conducting contact surface on the edges 8 there are formed holding arms 46 which interact with a holding clamp 47 of U-shaped cross section, and, namely, with its free U-shanks 48. The holding arms 46 present on their free ends on their outside rest cams 43 which are gripped behind by rest cams 49 on the U-shanks 48 in the emplaced state of the clamp 47. The free U-shanks 48 are constructed spring-elastic, so that in the insertion of the clamp 47 these spring apart and in the snapped-in state, see FIG. 8, spring back behind the rest cams 43 with their rest cams 49. On the side facing the pipe line of the base shank 51 there is arranged a pressure body 52 of elastic material, which in the emplaced state of the clamp 47 presses the pipe line 1 into the profile of the heat conducting contact surface. 6.

Figure 9:
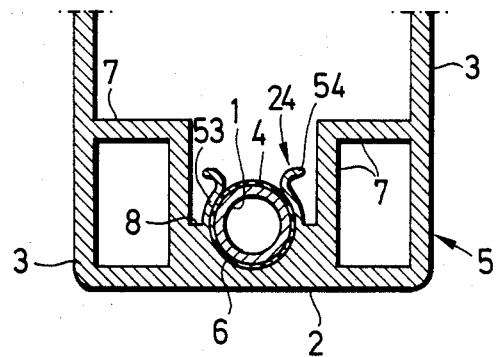

In FIG. 9 there is represented another form of execution of the invention, in which again like parts are provided with the same reference numbers as in the preceding figures. The clamping device 24 consists here of resilient holding arms 53 which are constructed on the edges 8 of the heat conducting surface 6. The springy holding arms 53 are constructed in arcuate form and have outward-rounded points 54 at their free ends. The insertion opening bounded by the rounded points 54 has a smaller opening width than the size of the diameter of the pipe line 1, so that in the introduction of the pipe line 1, the holding arms 53 are spread apart and in the engagement of the pipe line 1 on the heat conducting contact surface 6 they spring back and in so doing embrace the pipe line 1 springily, so that this is pressed against the heat conducting contact surface 6. The heat conducting contact surface 6 is formed in the present embodiment directly on the inside of the horizontal side wall 2, there being provided a widening of the wall thickness. The crosspieces 7 which communicate with the vertical side walls, are constructed in L-shape.

Figure 10:
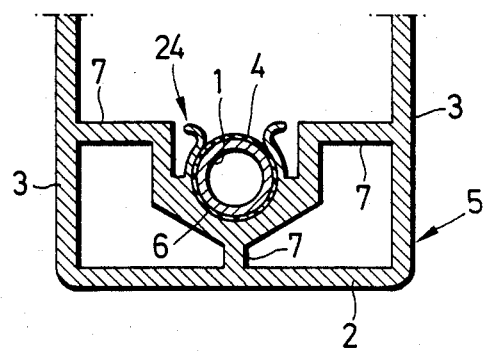

In FIG. 10 the formation of the clamping device of the heat transfer profile 5 of the invention corresponds to the construction according to FIG. 9, and like parts are provided with the same reference numbers as in the other FIGS. 1 to 9. Here, too, the crosspieces in connection with the side walls 3 are constructed in L-shape, but the L-shank running to the slide walls 3 is shorter than in FIG. 9. In distinction to FIG. 9, here again there is present a crosspiece running parallel to the side walls 3 and perpendicular to the side wall 2 present lying opposite the opening of the profile of the heat conducting contact surface 6. In the embodiment represented the profile of the heat conducting contact surface 6 has an enlarged wall thickness, whereby the storage capacity of the profile is increased. A corresponding statement holds also for the embodiment according to FIG. 9.

Figure 11:
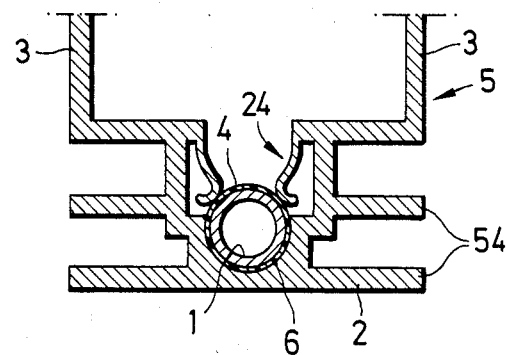
Figure 12:
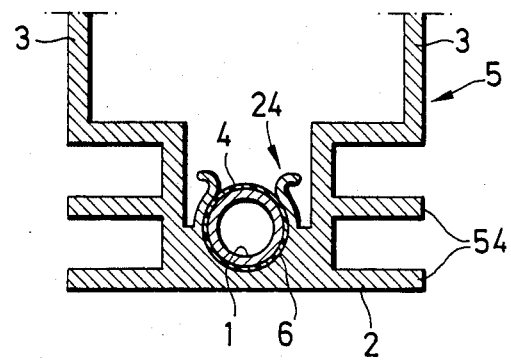

In FIGS. 11 and 12 there is again represented in each case an alternative execution of a heat transfer profile 5 according to the invention, like parts being provided with the same reference numbers as in the preceding figures. In FIG. 11 the formation of the profile of the heat conducting contact surface 6 corresponds to that of FIG. 9, the clamping device 24, however, being constructed according to the embodiment of FIG. 1. The embodiment according to FIG. 12 corresponds in the formation of the profile of the heat conducting contact surface 6 as well as of the clamping device 24 to the embodiment according to FIG. 9. Both embodiments according to FIG. 11 and FIG. 12 have in common the same formation of the side walls 3 of the heat transfer profile 5, here the surface of the side walls 3 being enlarged by ribs 54, whereby there is achieved a higher heating performance.

The forms of execution represented in FIGS. 1 to 12 present clamping devices of differing form. These clamping device 24 can extend over the entire length of the heat conducting contact surface 6, or can in each case be constructed spatially bounded, so they do not extend over the entire length of the heat conducting contact surface 6, i.e., so that several such clamping devices can be provided spaced from one another.

Figure 13:
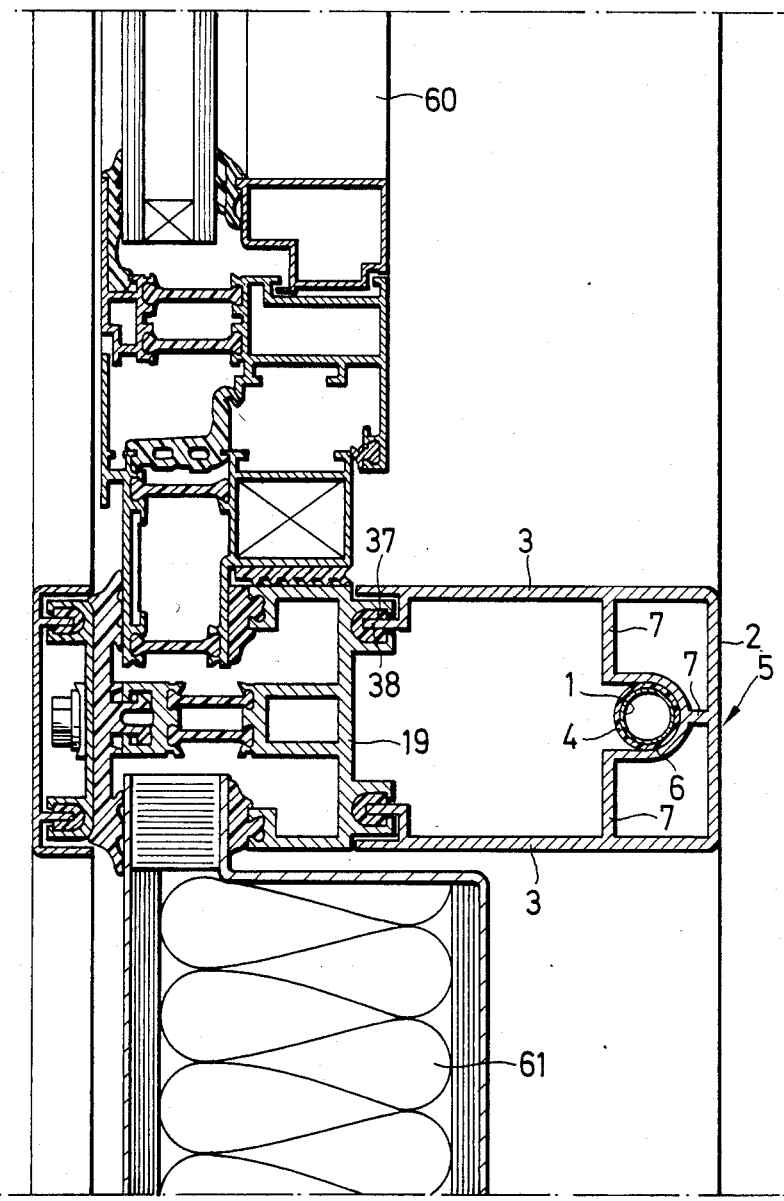
FIG. 13 shows a vertical section through a window construction with heat-insulated railing element with a horizontal heat transfer element according to the invention as railing cross-beam.

In FIG. 13 there is shown an embodiment of the invention in which a heat transfer profile 5 according to the invention is shown in connection with a facade construction that consists of a window 60 and a heat-insulated railing element 61. The heat transfer profile 5 of the invention is used here as a horizontal railing cross-beam. Likewise with a corresponding construction the use of a heat transfer profile 5 according to the invention as a post is possible. Otherwise, here like parts are provided with the same reference numbers as in the preceding figures. As clamping device 24 for the pipe line 1 inside the heat transfer profile 5 of the invention, there are possible alternatively the clamping devices described in preceding figures. In the construction represented according to FIG. 13 and in the form of execution according to FIG. 1, as well as in the other forms of execution of FIGS. 2 to 12, the heat transfer profile 5 is constructed as a supporting element, i.e., it is part of a facade, and the other facade elements are fastened to the heat transfer profile.

Figure 14:
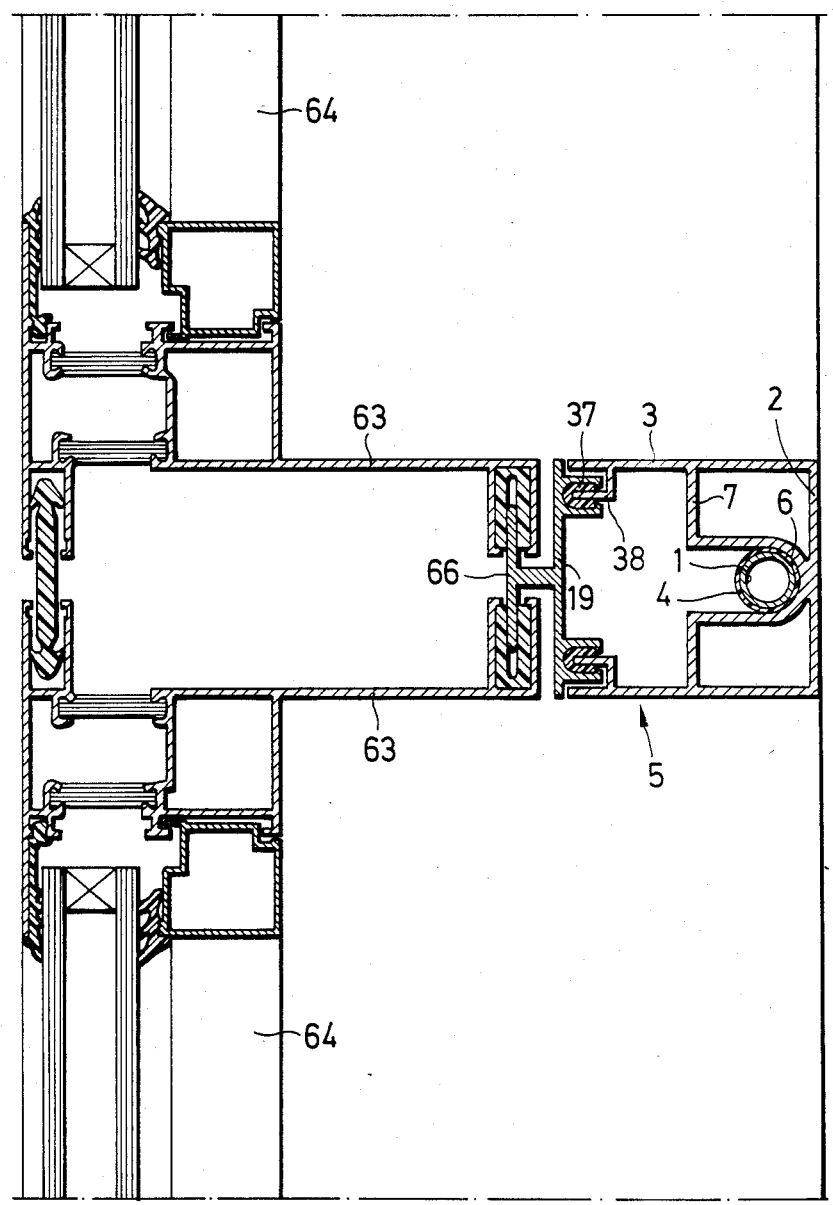
FIG. 14 shows a horizontal section through a window glazing with vertical double posts and an integrated heat transfer profile according to the invention.

In FIG. 14 now there is represented an embodiment in which the heat transfer profile 5 of the invention does not serve as supporting element, but serves here rather as supporting or carrying element of the posts 63. In FIG. 14 there is represented the use of the heat transfer profile 5 of the invention in conjunction with a solid glazing 64 and vertical double posts 63. There the supporting wall 19 is connected with this over a T-flange 66 that is conducted inside the vertical double post 63. The vertical double post 63 there takes over all the supporting functions. Otherwise, the same parts are provided with the same reference numbers as in the preceding figures. As clamping device there come in question alternatively the clamping devices 24 described in the preceding figures.

Figure 15:
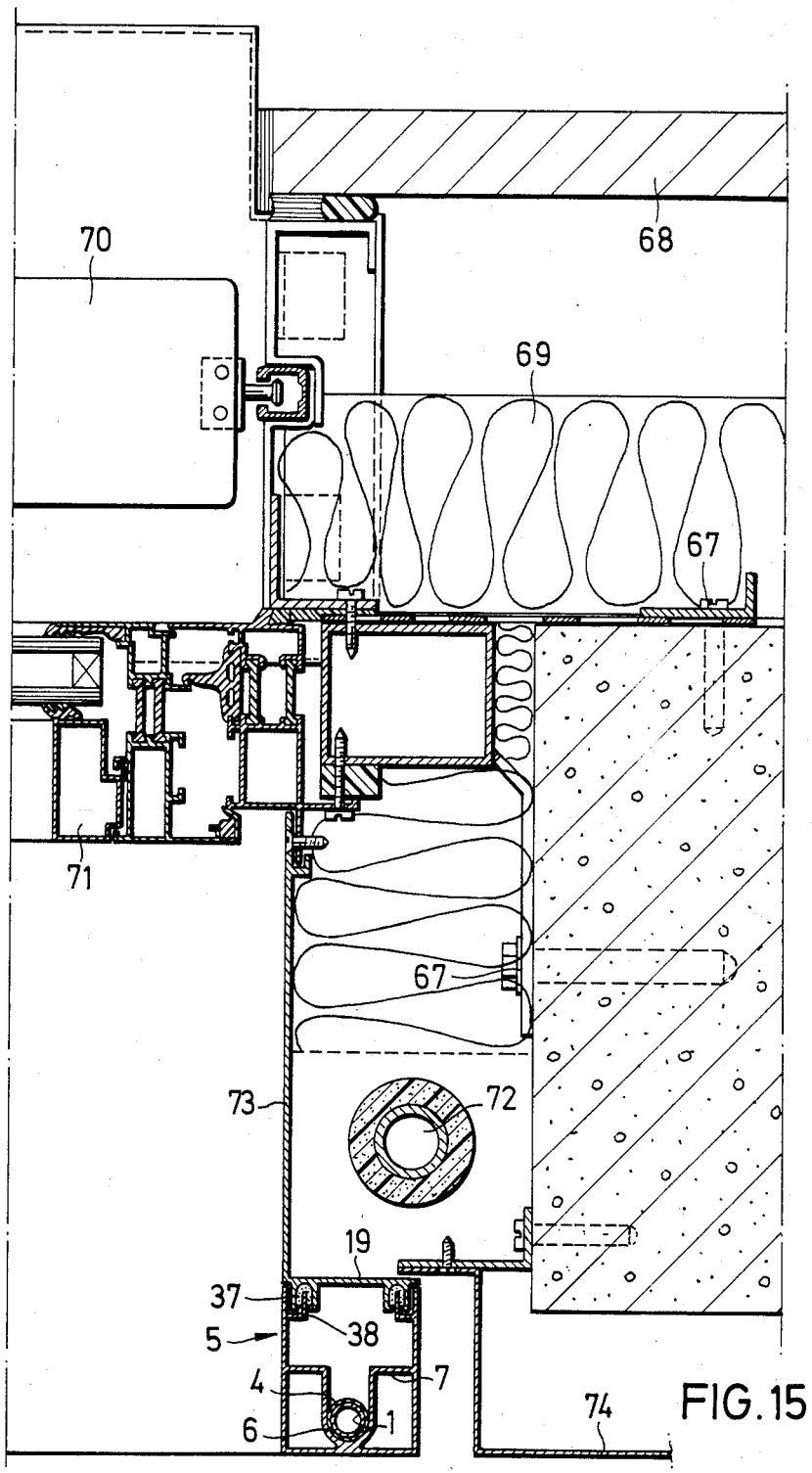
FIG. 15 shows a horizontal section through a wall connection with curtained facade and heat insulation, outer sun protection and window to be opened as well as an integrated heat transfer element according to the invention.

In FIG. 15 there is represented a further example of use of a heat transfer profile according to the invention. Here, a wall connection 67 is shown conjoined with a curtained facade 68. A heat insulation 69 as well as an outer sun protection 70 and a window 71 to be opened are likewise represented. A vertical heating-and-cooling water supply line 72 runs inside a window soffit lining 73. The window soffit lining 73 serves simultaneously as carrier for the heat transfer profile 5 of the invention as the carrier (support) wall 19 is molded to the soffit element. Further, there is provided a wall lining 74. In this example of execution there is formed from the heat transfer profile of the invention a frame which is installed in the window cut-out on the side of the interior, so that here a frame profile is formed independently of the facade itself.

The dimentioning of the heat transfer guide surfaces and of the heat conducting cross sections of the heat transport fluid over the pipe line, the heat conducting contact element, the heat conducting contact surface and the head conducting crosspieces to the heat transfer element occurs with account taken of the heat emission on the room side, namely from the surface of the heat transfer profile to the room air, and, namely, in such a way that an optimal heat flow with low material constituent occurs in such a way that through a low temperature of the transport fluid there is achieved a uniform temperature on the surface of the heat transfer element. The heat flow density from the heat transfer profile to the environment determines the necessary surface of the crosspieces 7 with consideration taken of the crosspiece length as well as of the thickness of the heat conducting contact element 4. This heat flow establishes, with consideration taken of the fluid flow in the pipe line 1, the diameter of the pipe line 1. While the heat transfer profile consists, for reasons of costs, of a cheap metal, especially aluminum, the material of the pipe line conducting the heat transport fluid corresponds to a material of proven resistance to corrosion in heating system construction, in particular copper.

The differing length change arising in consequence of different coefficients of expansion of different metals and the surface friction caused by this between different metals with arising of noises on temperature changes is prevented, according to the invention by the heat conducting contact element that is arranged between the pipe line 1 and the heat conducting contact surface 6. The lower coefficient of expansion of, for example, copper generates with respect to the higher coefficient of expansion of, for example, aluminum with equal temperature change different length changes. By corresponding layout and dimensioning of the heat conducting contact element it is possible according to the invention to chose the temperature of the heat transport fluid in the pipe line in such a way that the lower expansion of the pipe line with respect to the higher expansion of the heat conducting contact surface at equal temperature is compensated by the higher temperature of the heat transport fluid. Through the heat conducting contact element of the invention, accordingly there can occur a control to the effect that there is achieved the same length change despite different materials in the pipe line and in the heat conducting contact surface. The layout of the heat conducting contact element 4 occurs in dependence on the material combination of the heat transfer profile 5 with the pipe line 1. The length difference between the heat transfer profile 5 with the appertaining length expansion coefficient and of the pipe line 1 with the appertaining length expansion coefficient is eliminated in consequence of the temperature tradient in the heat conducting contact element. Thus tensions on the material separating places are therewith decomposed.

The present invention is not restricted to the examples of execution shown, but comprises all like-acting means in the sense of the invention, It also lies within the scope of the invention to arrange the heat transfer profiles independently of the facade construction, namely in connection with other components, such as, for example, windows, walls, railings and ceilings, on room side; likewise it is possible to allocate to the heat transfer profiles air conduits for a space ventilation. Further, static or dynamic heating bodies can be integrated with the system of the invention. It likewise lies within the scope of the invention to use the heat transfer profiles 5 according to the invention in all productive industrial and manufacturing thermal processes.

We claim:

1. System for controlling temperature of rooms of a building by means of frame elements consisting of metal uprights and cross-beams, for example for building openings such as windows and doors, in which a fluid is conducted in a pipe line running through a hollow interior space of the uprights and cross-beams, and the temperature of surfaces facing an interior of the building of the frame elements is controlled by indirect heat transfer, characterized in that the indirect heat transfer between the pipe line (1) and a heat transfer profile (5) formed by the frame elements occurs through placement of said pipe line (1) on heat conducting contact surfaces (6) for support thereof, said heat conducting contact surfaces (6) being connected over crosspieces (7) to said heat transfer profile (5) to provide a one piece construction thereof for heat conduction therebetween, and a heat conducting contact element (4) disposed between said pipe line (1) and said heat conducting contact surfaces (6), said heat conducting contact element (4) being in contact with said pipe line (1) and in removable contact with said heat conducting contact surfaces (6) so that said pipe line (1) can be removed from said heat conducting contact surfaces (6).

2. System according to claim 1, characterized in that the pipelines (1) consists of synthetic material.

3. System according to claim 1, characterized in that the heat conducting contact element (4) consists of a contact film, a foil, a sleeve or a coating, of synthetic material.

4. System according to claim 1, characterized in that the pipe line (1) is separated with heat insulating and pipe conducting effect by a supporting insulating element (10) from a carrier wall (19) with which the heat transfer profile (5) is detachably joined.

5. System according to claim 1, characterized in that the heat conducting contact surfaces (6) embrace the pipe line (1) semicircularly.

6. System according to claim 5, characterized in that the heat conducting contact surfaces (6) are formed by a half-shell profile.

7. System for controlling temperature of rooms of a building by means of frame elements consisting of metal uprights and cross-beams, for example for building openings such as windows and doors, in which a fluid is conducted in a pipe line running through a hollow interior space of the uprights and cross-beams, and the temperature of surfaces facing an interior of the building of the frame elements is controlled by indirect heat transfer, characterized in that the indirect heat transfer between the pipe line (1) and a heat transfer profile (5) formed by the frame elements occurs through placement of said pipe line (1) on heat conducting surfaces (6), said heat conducting contact surfaces (6) being connected over crosspieces (7) to said heat transfer profile (5) to provide a one piece construction thereof for heat conduction therebetween, and spring elements arranged inside said heat transfer profile (5) to provide a clamping support to hold said pipe line (1) on said heat conducting contact surfaces (6), said spring elements generating a spring tension between said pipe line (1) and said heat transfer profile (5).

8. System for controlling temperature of rooms of a building by means of frame elements consisting of metal uprights and cross-beams, for example for building openings such as windows and doors, in which a fluid is conducted in a pipe line running through a hollow interior space of the uprights and cross-beams, and the temperature of surfaces facing an interior of the building of the frame elements is controlled by indirect heat transfer, characterized in that the indirect heat transfer between the pipe line (1), and a heat transfer profile (5) formed by the frame elements occurs through placement of said pipe line (1) on heat conducting contact surfaces (6), said heat conducting contact surfaces (6) being connected over crosspieces (7) to said heat transfer profile (5) to provide a one piece construction thereof for heat conduction therebetween, said heat conducting contact surfaces (6) having a half-shell profile embracing said pipe line (1) semicircularly, and springly holding arms (16, 53) lying opposite one another being provided on said half-shell profile of said heat conducting contact surfaces (6) to provide an insertion opening (17), said springy holding arms (16, 53) being spreadable from one another in correspondence to an outside diameter of said pipe line (1), said springy holding arms (16, 53) clamping said pipe line (1) in said half-shell profile of said heat conducting contact surface (6).

9. System for controlling temperature of rooms of a building by means of frame elements consisting of metal uprights and cross-beams, for example for building openings such as windows and doors, in which a fluid is conducted in a pipe line running through a hollow interior space of the uprights and cross-beams, and the temperature of surfaces facing an interior of the building of the frame elements is controlled by indirect heat transfer, characterized in that the indirect heat transfer between the pipe line (1) and a heat transfer profile (5) formed by the frame elements occurs through placement of said pipe line (1) on heat conducting contact surfaces (6), said heat conducting contact surfaces (6) being connected over crosspieces (7) to said heat transfer profile (5) to provide a one piece construction thereof for heat conduction therebetween, said heat conducting contact surfaces (6) having a half-shell profile embracing said pipe line (1) semicircularly, oppositely situated rest arms (26, 41, 26) being provided on said half-shell profile of said heat conducting contact surfaces (6), said rest arms (26, 41, 46) including rest cams (27, 43), and a pressure body (25, 42, 52) arranged between said rest arms (26, 41, 46) and said pipe line (1), said rest cams (27, 43) clamping said pressure body (25, 42, 52) on said pipe line (1).

10. System for controlling temperature of rooms of a building by means of frame elements consisting of metal uprights and cross-beams, for example for building openings such as windows and doors, in which a fluid is conducted in a pipe line running through a hollow interior space of the uprights and cross-beams, and the temperature of surfaces facing an interior of the building of the frame elements is controlled by indirect heat transfer, characterized in that the indirect heat transfer between the pipe line (1) and a heat transfer profile (5) formed by the frame elements occurs through placement of said pipe line (1) on heat conducting contact surfaces (6), said heat conducting contact surfaces (6) being connected over crosspieces (7) to said heat transfer profile (5) to provide a one piece construction thereof for heat conduction therebetween, and said heat transfer profile (5) being detachably connected with a carrier wall (19) in such a way that a sliding relative movement is possible between said heat transfer profile (5) and said carrier wall (19).

11. System according to claim 6, characterized in that the half-shell profile extends over a length of the pipe line (1).

12. System according to claim 7, characterized in that the spring elements are constructed as leaf springs (39) which abut with their two free ends on oppositely lying walls (3) of the heat transfer profile (5) and lie with a bulge (40) formed between the free ends on the pipe line (1).

13. A system according to claim 8, characterized in that the half-shell profile of the heat conducting contact surfaces (6) is joined over by at least three crosspieces (7) with the heat transfer profile (5).

14. System according to claim 13, characterized in that one of the crosspieces is formed opposite an opening (20) of the halfshell profile of the heat conducting contact surfaces (6) and the other two crosspieces (7) are offset through 90° with respect to said one crosspiece and are formed opposite one another.

15. System according to claim 14, characterized in that the other two crosspieces (7) start snuggly in each case on a longitudinal edge (8) of the half-shell profile of the heat conducting surfaces (6).

16. System according to claim 14, characterized in that the oppositely lying crosspieces are composed of a crosspiece section (10) running parallel to a horizontal side wall (2) of the heat transfer profile (5) as well as of an extension section (9) following upon it running parallel to a vertical side wall (3), which extension section is connected with a longitudinal edge (8) of the heat conducting contact surfaces (6).

17. System according to claim 16, characterized in that in a connecting zone of the extension section (9) and of the crosspiece section (10), the springy holding arms (16) are arranged in such a way that they face in the direction of the heat conducting contact surfaces (6) and enclose with their bent-off free ends the insertion opening (17), the opening width of which is smaller than the outside diameter of the pipe line (1), so that in an inserted state of the pipe line (1) this is held clamped by the springy arms in the profile of the heat conducting contact surfaces (6).

18. System according to claim 8, characterized in that the springy holding arms (53) are constructed arcuate and form with their outward-bent ends the insertion opening (17), the opening width of which is less than the outside diameter of the pipe line (1) and the arcuate form of the springy arms is such that in an inserted state of a pipe line (1) this is clamped by the springy arms in the profile of the heat conducting contact surfaces (6).

19. System according to claim 9, characterized in that a clamp (47) with U-shaped cross section is thrust with its spring-elastic free U-shanks (48), on free ends of which there are formed rest cams (49), onto the rest arms (46) and on an inside of a base shank (51) of the clamp (47) there is arranged the pressure body (52).

20. System according to claim 9, characterized in that the pressure body (25) has U-shaped cross section and vertical U-shanks (28), on the free ends of which there are formed rest cams (29), that in an inserted state snap into undercuttings (27) of the rest arms (26), the pipe line (1) being clamped inside the profile of the heat conducting contact surfaces (6).

21. System according to claim 9, characterized in that the pressure body (42) is truncated-conical in cross section and its point is circularly rounded with adaptation to the form of the pipe line (1) and in an inserted state is gripped behind by end-side rest cams (43) of the rest arms (41), so that the pipe line (1) is clamped in the profile of the heat conducting contact surface (6).

22. System according to claim 9, characterized in that the pressure body is constructed as a holding clamp (33) of U-shaped cross section, whose base shank runs arcuately, and, namely, with adaptation to the form of the pipe line (1) and whose vertical U-shanks (35) engage with outward-projecting rest cams (36) in undercuttings (27) of the rest arms (26) in such a way that in an inserted state of the holding clamp (33) the pipe line (1) is held with clamping effect in the profile of the heat conducting contact surfaces (6).

23. System according to claim 6, characterized in that the crosspiece (7) lying opposite an opening (20) of the half-shell profile of the heat conducting surfaces (6) is shortened in such a way that the half-shell profile is arranged directly on the heat transfer profile (5).

24. System according to claim 1, characterized in that the heat transfer profile (1) is constructed as carrying facade element.

25. System according to claim 1, characterized in that the heat transfer profile (5) is part of a facing element.

26. System according to claim 1, characterized in that said pipe line (1) consists of metal, said pipe line metal being copper.

27. System according to claim 1, characterized in that releasable clamping means clampingly hold said pipe line (1) on said heat conducting contact surfaces (6) and permit the removal of said pipe line (1) from said heat conducting contact surfaces (6).

* * * * *